(12) United States Patent
Gombert et al.

(10) Patent No.: US 10,343,277 B2
(45) Date of Patent: Jul. 9, 2019

(54) ROBOT ARM COMPRISING AN INPUT MODULE

(71) Applicant: ABB GOMTEC GMBH, Seefeld (DE)

(72) Inventors: Bernd Gombert, Wörthsee (DE); Michael Ries, Olching (DE); Ákos Semsey, Regensburg (DE)

(73) Assignee: ABB SCHWEIZ AG, Baden (CH)

( * ) Notice: Subject to any disclaimer, the term of this patent is extended or adjusted under 35 U.S.C. 154(b) by 144 days.

(21) Appl. No.: 15/039,602

(22) PCT Filed: Nov. 27, 2014

(86) PCT No.: PCT/EP2014/003168
§ 371 (c)(1),
(2) Date: May 26, 2016

(87) PCT Pub. No.: WO2015/078585
PCT Pub. Date: Jun. 4, 2015

(65) Prior Publication Data
US 2017/0266807 A1     Sep. 21, 2017

(30) Foreign Application Priority Data

Nov. 28, 2013 (DE) .................. 10 2013 019 869

(51) Int. Cl.
*B25J 9/16* (2006.01)

(52) U.S. Cl.
CPC ............. *B25J 9/161* (2013.01); *B25J 9/1602* (2013.01); *B25J 9/1617* (2013.01); *G05B 2219/33105* (2013.01); *G05B 2219/36433* (2013.01); *G05B 2219/39335* (2013.01); *G05B 2219/39427* (2013.01); *G05B 2219/40304* (2013.01)

(58) Field of Classification Search
CPC ........ B25J 9/1602; B25J 9/161; B25J 9/1617; G05B 2219/39335; G05B 2219/33105; G05B 2219/36433; G05B 2219/39427; G05B 2219/40304
See application file for complete search history.

(56) References Cited

U.S. PATENT DOCUMENTS

| | | | | |
|---|---|---|---|---|
| 5,428,713 A | * | 6/1995 | Matsumaru | B25J 9/1615 700/245 |
| 7,971,504 B2 | * | 7/2011 | Haniya | B25J 9/0087 74/490.03 |

(Continued)

FOREIGN PATENT DOCUMENTS

| | | |
|---|---|---|
| DE | 10 2004 054867 | 5/2006 |
| EP | 2184659 | 5/2010 |
| WO | WO 2007 0099511 | 9/2007 |

OTHER PUBLICATIONS

International Search Report for PCT Application PCT/EP2014/003168, dated Jun. 1, 2015, European Patent Office.

(Continued)

*Primary Examiner* — Rachid Bendidi

(57) ABSTRACT

The invention concerns a robotic arm (1) with at least two arm modules (41, 42) which are moveable relative to one another and at least one manually operable input module (11) for generating control signals for the control of the robotic arm (1) on the basis of a user input. Both arm modules (41, 42) have a first interface (38, 40) onto which the input module (11) can be selectively mounted.

16 Claims, 8 Drawing Sheets

(56) References Cited

U.S. PATENT DOCUMENTS

| | | | | |
|---|---|---|---|---|
| 8,410,732 B2* | 4/2013 | Kassow | ............... | B25J 19/0004 |
| | | | | 318/371 |
| 8,453,533 B2* | 6/2013 | Ryland | ................... | B08B 9/045 |
| | | | | 74/490.05 |
| 8,614,559 B2* | 12/2013 | Kassow | ............... | B25J 19/0004 |
| | | | | 318/568.11 |
| 8,779,715 B2* | 7/2014 | Kassow | ............... | B25J 19/0004 |
| | | | | 318/568.1 |
| 2010/0094461 A1* | 4/2010 | Roth | ..................... | B25J 9/1664 |
| | | | | 700/251 |
| 2013/0255426 A1* | 10/2013 | Kassow | ............... | B25J 19/0004 |
| | | | | 74/490.03 |

OTHER PUBLICATIONS

Written Opinion PCT/EP2014/003168, dated Jun. 8, 2015, German Patent Office.

\* cited by examiner

ROBOT ARM COMPRISING AN INPUT MODULE

The present invention relates to a robotic arm with a manually operable input module for control of the robotic arm.

Robots are used in a wide variety of technical applications. A widely used form of robot is the robotic arm. Robotic arms are frequently used to relieve the physical burden on humans when carrying out manual work. In this way, human workers are relieved of the necessity to carry out strenuous actions themselves. If such actions need to be repeated identically numerous times, as in industrial production for example, it is often sufficient to program the path to be followed by the robotic arm once and thereafter have the movement along the path controlled by a computer. DE 32 40 251 discloses an input module for programming such a path. The input module can be installed in a fixed position separate from the robotic arm or can be to attached to an end effector of the robotic arm so that it moves together with the robotic arm. In either case, the input module permits deliberate control only of the end effector. If an intermediary arm module of the robotic arm is blocked by an obstacle, the robot cannot perform a planned movement.

DE 32 11 992 A1 discloses a paint spraying robot with several arm modules connected via articulated joints. Two of the arm modules each carry an input module in the form of a handle which is equipped with sensors to detect the direction of a force applied to the handle by a user. In this way, an intermediary arm module can also be deliberately guided by means of the attached handle, avoiding a blockage by an external obstacle.

Generally speaking, the greater the number of arm modules a robotic arm has which are moveable relative to one another, the more likely it is that an intermediary arm module can be moved around an obstacle, but it is also all the more costly to equip all arm modules with the necessary input modules. Although it is possible to save costs by leaving individual arm modules without an input module, this only makes sense if it is certain that an arm module without input module is not in any danger of being blocked by an obstacle. The purchasers of a robotic arm must therefore decide whether they either wish to invest considerable sums in input modules, not all of which they may necessarily need, or run the risk that the robotic arm cannot perform a desired movement because an intermediary arm module is blocked by an obstacle and cannot be steered around the obstacle.

The object of the invention is to create a robotic arm which is economical to manufacture yet in which the risk of being blocked by an obstacle is minimised.

The problem is solved through a robotic arm with at least two arm modules which are moveable relative to one another and at least one manually operable input module for generating control signals for the control of the robotic arm on the basis of a user input, wherein at least two of the arm modules have a first interface onto which the input module can be selectively mounted.

The user of the robotic arm thus has the possibility of selecting the point of attachment of the input module depending on requirements and if necessary adapting it to the environment in which the robotic arm is used. Input modules which are not required in order to avoid an obstacle need not be fitted, nor do they need to be purchased, so that the user is able to minimise the costs of acquisition of the robotic arm. If it transpires that, in a particular working environment, the number of input modules is not sufficient in order to guide the arm around all obstacles, a further input module can be purchased and fitted. Since the same design of input module can be used at different points on a robotic arm, it can be manufactured in large quantities and offered for sale correspondingly cheaply by the manufacturer.

The robotic arm can thus also be adapted to particular applications. If, for example, one end of the robotic arm needs to penetrate into a working area in which manual operation is not possible, the robot could not be controlled with an input module located on this end. According to the invention this problem can therefore be avoided in that the input module is, instead, fitted in a position which is manually accessible.

Since the input module can be attached to different arm modules, it is practical if means are provided which can identify the interface to which the input module is attached. Therefore, the invention advantageously includes a corresponding control unit which automatically recognises, on the basis of the occupancy or non-occupancy of the available interfaces, to which interface the input module is attached. In addition, this control unit is preferably set up to take into consideration the interface to which the input module is fitted when evaluating the control signal supplied by the input module. The input module thus causes the robotic arm to be controlled in a different way depending on the installation position of the robotic arm. If for example the input module is attached at the end of the robotic arm, then this end can be moved freely in space by means of the input module. If, on the other hand, the input module is attached to an intermediary arm module, then only this intermediary arm module is moved along the movement path specified by the input module. In this case the arm modules attached beyond the intermediary arm module are simply carried along.

The operation of the robot should be as intuitive as possible. This is achieved if the robotic arm moves in the same direction in which the user applies a force to the input module. Therefore, the control unit is preferably set up to control a movement of the robotic arm in such a way that the interface to which the input module is fitted is moved in the direction of a force applied to the input module.

The robotic arm can be composed of different arm modules. In a similar way to a modular system, several arm modules of identical or different construction design can be combined together by connecting the interface of one arm module to the interface of another arm module. For example, the first interface of the arm modules provided according to the invention can be used for mutual connection of the arm modules. Alternatively, an arm module can have a second interface which can be connected with a first interface of another arm module.

If an arm module has two interfaces, then the interfaces are preferably attached to the arm module in such a way that they are moveable relative to one another in at least one degree of freedom. For this purpose the arm module can have an articulated joint which is arranged between the two interfaces and thus makes possible a relative movement of one interface relative to the other interface. If several arm modules with integrated articulated joints are connected together, a moveable robotic arm with several degrees of freedom can be assembled.

In an advantageous embodiment of the invention, the input module can be integrated between two arm modules. For this purpose, the input module can have two interfaces, one of which can be connected with an interface of the first arm module and the other being connectable with an interface of the second arm module. In particular, such a structure makes it possible to add an input module to an existing modular robotic arm made up of several arm modules connected together via interfaces which does not have a free interface for the attachment of an input module.

The design of the interfaces can vary. The first interface can be designed as a first type, for example a plug-type, and the second interface can be designed as a second type, for example socket-type. However, the structurally different types are of complementary design so that they can be combined with other. Both the arm modules and the input module can have at least one first and/or one second interface type.

The modular design of the robotic arm allows a high degree of flexibility in the structure of the robot. Preferably, the arm modules can be fitted or replaced in different sequences. The user of the robot thus has a wide scope of configuration and can adapt the robotic arm individually to his requirements. For example, a robotic arm can be built up of at least three arm modules and one input module. Two of the arm modules can be connected together in the manner described above. According to the invention, the third arm module can be mounted either on the first interface of the second arm module or on an interface of the input module, depending on whether or not the input module was fitted to the second arm module. The interface of the third arm module is designed accordingly for this purpose. The user thus has free choice in combining the modules with one another.

In an advantageous embodiment of the invention, the third arm module is equipped with a tool or an instrument or is itself designed in the form of a tool or instrument.

The input module should have a base body as well as a control element which is used for the actually inputting control signals by hand. The control element can be attached to the base element so as to be moveable, in particular in three degrees of freedom of translation and/or rotation. However, it can also, without being moveable, be sensitive to the magnitude and direction of a force or torque applied to it. The robotic arm or the base element connected with the robotic arm can be guided freely in space according to the direction of operation. If for example the control element is pressed downwards from above, then the input module is moved downwards. If the control element is rotated, the robotic arm will swivel in the corresponding direction of rotation.

The control element can be present in different embodiments. In a first form, the control element is designed as a cap which is attached laterally to the base body. This makes the control element easily accessible and it can readily be gripped and operated by a hand.

In an alternative form, the control element extends around the base body. Preferably, the control element is ring-formed and can also be operated in six degrees of freedom.

The interfaces of the input module are preferably located on the end faces of the base body, which can be arranged separate from and opposite one other.

The input module can also be equipped with several control elements. For example, the input module can include a second control element which has a further function. This makes it possible for the user to move the robotic arm at a particular speed through operation of one control element and move it at a different speed through operation of the other control element. For this purpose, the two control elements can be assigned a particular speed so that a different speed is specified depending on which control element is operated. Alternatively, the second control element can function as a regulator by means of which the speed at which the robotic arm moves in the direction specified through the input to the first control element can be adjusted. This makes it possible to vary the speed continuously.

According to the invention, the input module can have further functions which improve the safety or reliability of the input module. Accordingly, a simultaneous operation of two or more control elements can be detected. However, in order to give priority to only one control element, this control element can be prioritised over the other control elements. As a result, only the control commands from the prioritised control element are carried out.

The input module can also be equipped with a device for sensing the accelerations acting on the input module. Important movement information can be determined from the acceleration values, for example the speed with which the robotic arm is being moved, or the current position of the input module. By comparing the determined values with the commands from the control element it can then be verified whether the commands correspond with the actual values. If deviations exist, a corresponding status message can be generated for the user, or the deviations can be automatically compensated.

Further features and advantages of the invention are explained in the following description of exemplary embodiments with reference to the attached figures, in which FIG. 1 shows a robotic arm built up out of several arm modules and an input module;

Figure 1:
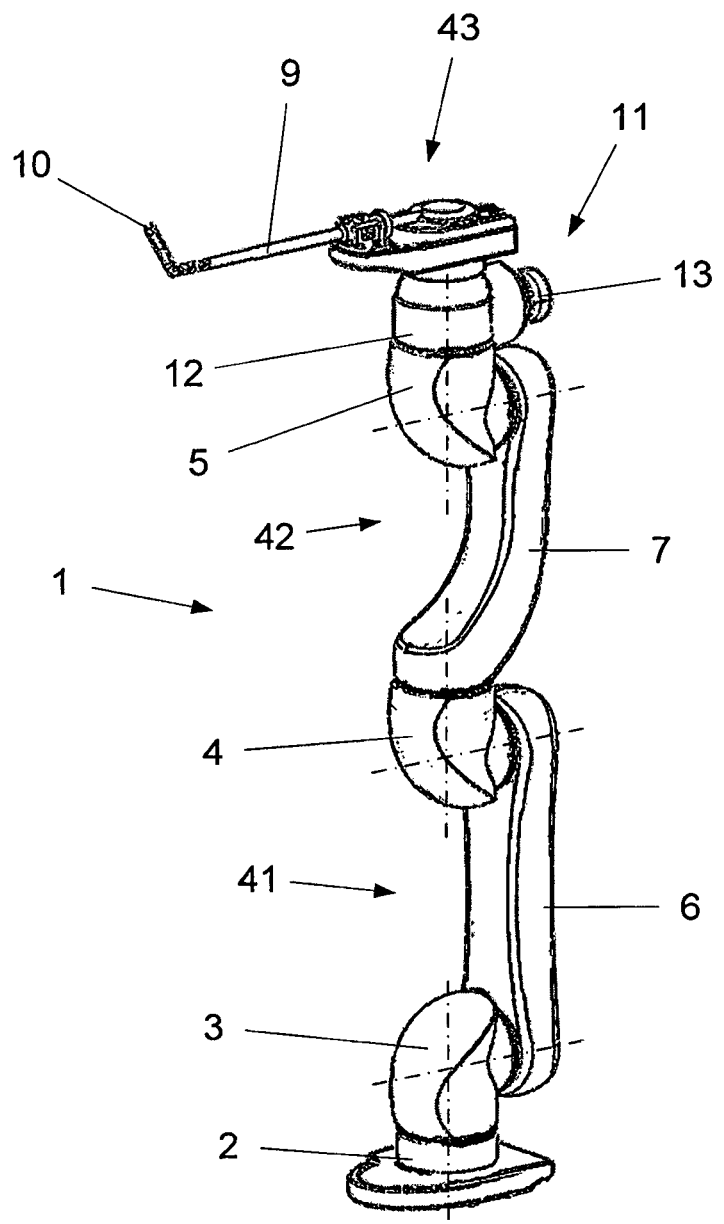

FIG. 1 shows a robotic arm 1 consisting of several modules, namely a first, lower arm module 41, a second, central arm module 42, a third, upper arm module 43 as well as an input module 11. The arm modules 41, 42 and 43 are in turn composed of modular components 2, 3, 4, 5, 6, 7. Each arm module can contain different modular components, in terms of type and number. The invention thus realises a modular principle according to which the different modular components can be combined as required. The structure of the robotic arm or the arm modules described in the following is therefore purely exemplary. The first arm module 41 comprises as modular components a base component 2, an articulated joint module 3 attached to this, an arm component 6 and an articulated joint module 4 which can be of the same design as the articulated joint module 3. The robotic arm 1 can be fixed in any location by means of the base component 2.

The second arm module 42 comprises as modular components an arm component 7 and an articulated joint module 5, which again can be identical in design to the components 6 or 3 and 4.

The third arm module 43 is designed in the form of a tool or instrument and comprises an instrument shaft 9 with an end effector 10 attached thereto.

The input module 11 is integrated between the second and third arm modules 42 and 43. The arm modules 42, 43 and the input module 11 are solidly connected with another and thus form a structural unit, the robotic arm 1.

The input module 11 comprises a base body 12 as well as a manually operable control element 13. The control element 13 is attached moveably to the base body 12 and can be operated in up to six degrees of freedom, i.e. in a Cartesian coordinate system the control element 13 can be pushed or pulled along the three spatial axes, as well as rotated around the three spatial axes.

The articulated joint modules 3, 4 and 5 preferably each have two joint axes, i.e. they create two rotational degrees of freedom between the modular components which they connect.

As mentioned above, the described structure of the robotic arm 1 is purely exemplary. Alternatively, an arm module 41, 42 and 43 could be made up of additional or fewer articulated joint modules and/or arm modules. In this way the length of the arm and the freedom of movement of the robotic arm can be adjusted.

Figure 2:
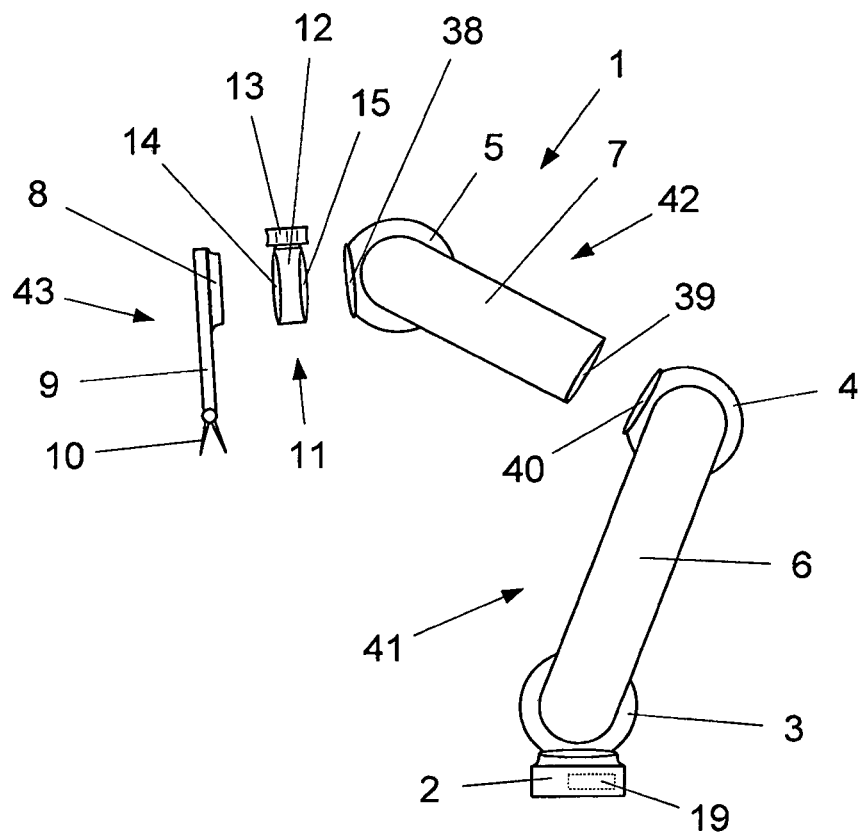
FIG. 2 shows a diagrammatic exploded drawing of the robotic arm shown in FIG. 1.

FIG. 2 represents the robotic arm 1 shown in FIG. 1 as a diagrammatic exploded drawing in which the three arm modules 41, 42 and 43 and the input module 11 are detached from one another for the purpose of graphic illustration of the interfaces.

Each arm module 41, 42 and 43 as well as the input module 11 has at least one interface by which the modules can be connected with one another. The interfaces can be differentiated into a first and second interface, whereby the first interface can be of a first type, for example a plug-formed type, and the second interface of a second type, for example a socket-formed type. Both interface types are of complementary design, so that an interface of the first type can be connected with an interface of the second type.

However, in an alternative embodiment, the two interfaces can also be identical in design.

The first arm module 41 has an interface 40 of the first type which can be connected with an interface 39 of the second type of the second arm module 42. The second arm module 42 also has an interface 38 of the first type which can be connected with an interface 8 of the second type of the third arm module 43. Thus, the arm modules 41, 42 and 43 can be connected with one another.

The input module 11 has an interface 15 of the second type. This means that the input module 11 can be connected either with the interface 40 of the first arm module 41 or with the first interface 38 of the second arm module 42, as shown in FIG. 1. In addition, the input module 11 has an interface 14 of the first type which can be connected with an interface of the second type of a further arm module. Thus, the second arm module 42 can be mounted on the input module 11 if the input module 11 is fixed to the first arm module 41, or the third arm module 43 can be mounted there if the input module 11 is fixed to the second arm module 42.

Accordingly, it is possible to integrate the input module 11 between the first and the second arm module 41 and 42 or between the second and the third arm module 42 and 43. It is also possible to integrate a second input module (not shown) in the robotic arm 1, so that an input module 11 is integrated between all three arm modules 41, 42, 43.

The modular design of the robotic arm 1 according to the invention thus makes it possible both to assemble the arm modules in any desired configuration and also to combine the modules with one another in any desired configuration or connect these to form a robotic arm 1. The structure of the robot can thus be adapted to individual requirements according to the modular principle.

The modular construction also facilitates the replacement of components. In order to carry out an instrument change, the third module 43 can simply be exchanged. In the event of a defect too, it is sufficient to exchange the affected module or the affected modular component instead of having to replace the complete robotic arm 1.

Figure 3:
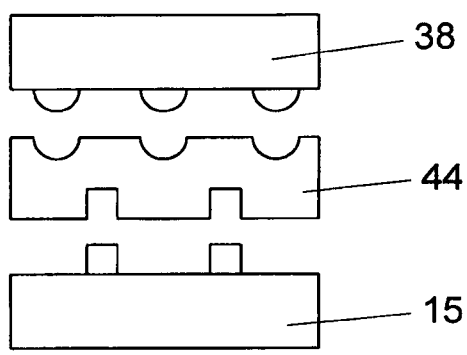
FIG. 3 shows an adapter for connecting two non-compatible interfaces.

As explained above, the interfaces 8, 14, 15, 38, 39, 40 are preferably complementary in design, so that they can be connected with one another. However, if the first and second interfaces are not compatible with one another, a further development of the invention provides for an adapter 44, which is fitted between the two interfaces 15, 38, as shown in FIG. 3. The adapter 44 has two interfaces, one interface being compatible with the first interface 15 and the other interface being compatible with the second interface 38. The adapter 44 can also be a permanent component of the first or the second interface 15, 38. This makes it possible, for example, for the user to connect together modules produced by different manufacturers.

Figure 4:
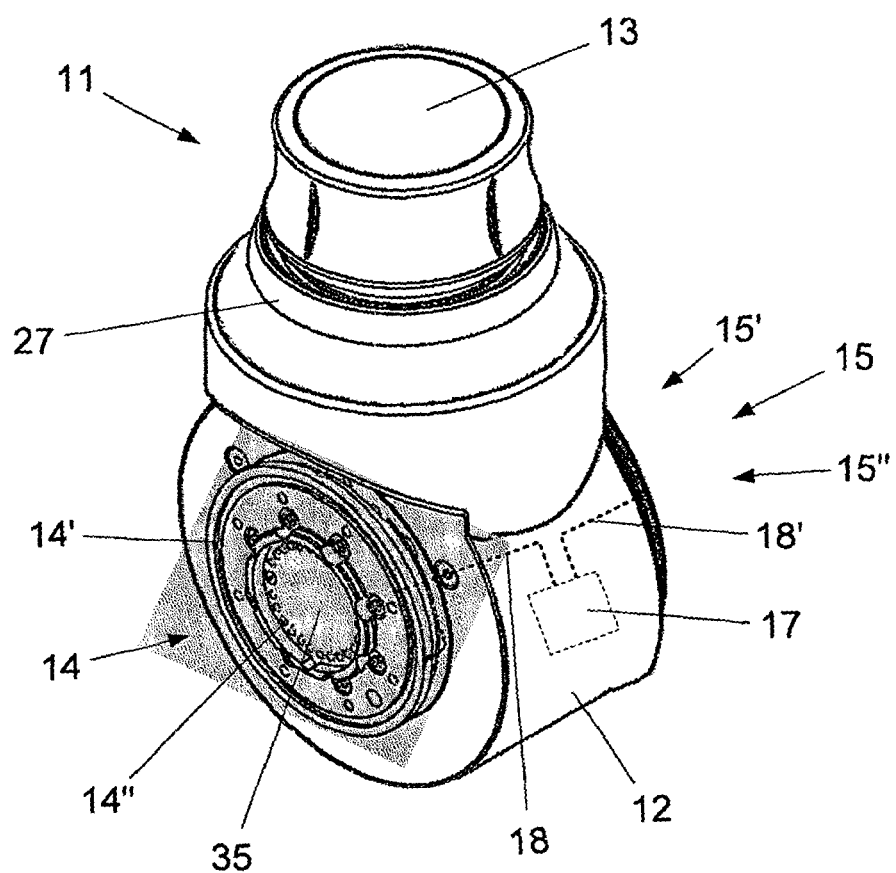
FIG. 4 shows an input module according to a first embodiment.

FIG. 4 shows the input module 11 in a first embodiment. It comprises a flat cylindrical base body 12 and a control element 13 projecting radially from the base body 12. The control element 13 is in the form of a cap which can preferably be operated in 6 degrees of freedom. For example, several piezoelectric sensors can be arranged between the control element 13 and the base body 12 in order to register the magnitude and direction of a force applied by a user to the control element 13, or optical sensors can be provided in order to register the extent and direction of a movement of the control element 13 relative to the base body.

The cylindrical base body 12 has on each of its end faces an interface 14, 15 via which it can be attached to one of the interfaces 8, 38, 39, 40 of one of the arm modules 41, 42 43. In the configuration shown in FIG. 1, one of the interfaces 14, 15 is connected with the arm module 42 via its interface 38 and the other is connected with the arm module 43 via its interface 8. Alternatively, it is possible to integrate the input module 11 between the interfaces 39, 40 of the arm modules 41, 42.

If the modular components of an arm module, for example the articulated joint modules 3, 4 and the arm component 6 of the arm module 41 are connected together by means of pairs of interfaces of the first and second types, the input module 11 can also be installed between two such modular components of an arm module.

The interface 14 shown in FIG. 4 is an interface of the first type. It comprises mechanical connecting means 14', in this case a flat connecting piece projecting beyond the end face of the base body 12 which is provided with an external thread on its peripheral surface and electrical contacts 14" have a mechanical interface 14', 15' and/or an electrical interface 14", 15". The interface 15 of the second type, not visible in FIG. 4, has a surface contour which only permits it to bring together electrical contacts 15" of the interface 15 with the contacts of an interface of the first type in a single orientation, and a union nut, rotatable around this surface contour, with an inner thread which is complementary with the interface 14.

The electrical contacts 14", 15" are connected together via at least one electrical cable 18, 18'. Currents and/or electrical signals can be transmitted from the input module 11 to an arm module 41, 42, 43 and back via this cable 18, 18' as well as being looped through from one arm module to the other. The electrical contacts 14", 15" can be designed as plug or friction contacts. In an advantageous embodiment of the invention, the electrical contacts 14", 15" are realised in the form of an interface circuit board 35.

The input module includes comprises an electronic evaluation unit 17, which is connected with the aforementioned sensors of the control element 13 in order to process their signals and pass these on via the cables 18, 18' to other modules of the robotic arm 1.

Figure 5:
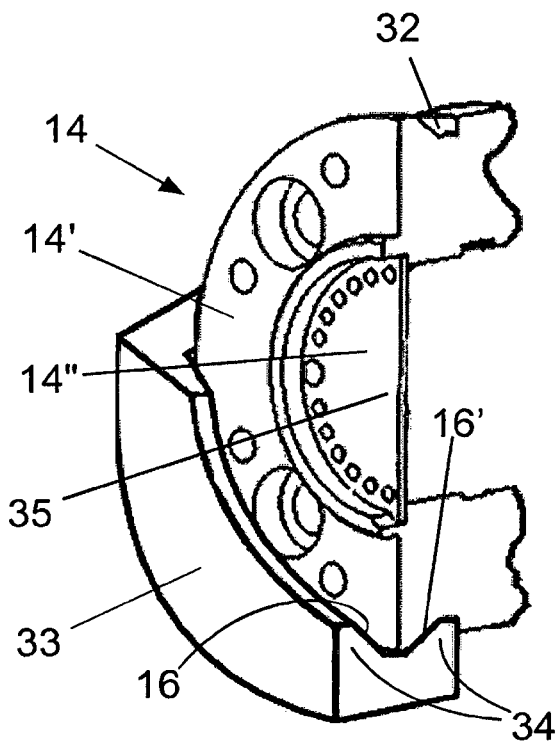
FIG. 5 shows a sectional view of a mechanical interface with a connecting ring.
Figure 6:
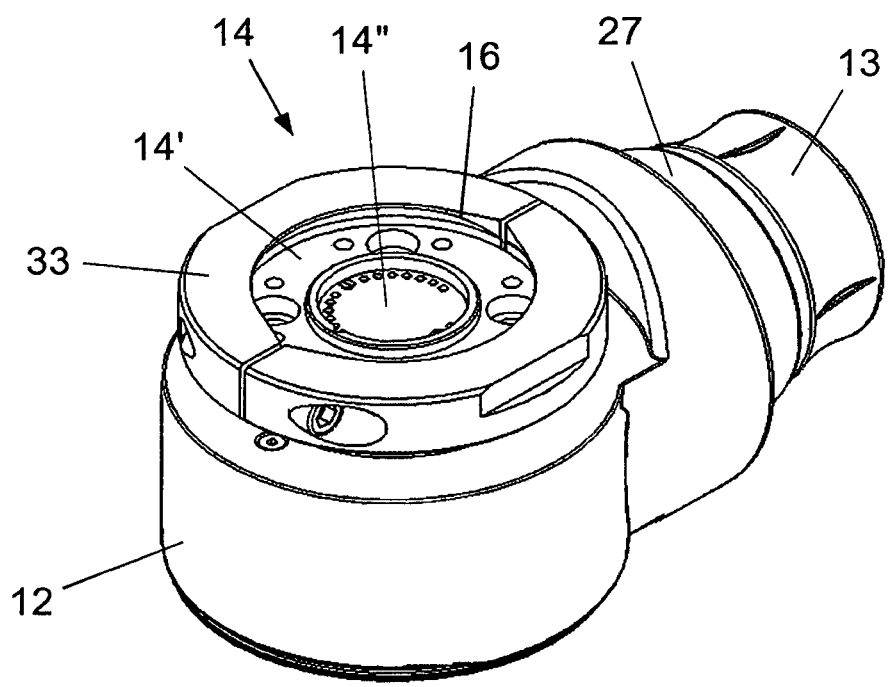
FIG. 6 shows an input module with a connecting ring.

FIG. 5 and FIG. 6 show an alternative embodiment of the interface 14. In this case the outer thread of the connecting piece is replaced with a peripheral groove 32, and instead of the union nut a connecting ring 33 is provided which is assembled from two halves which are screwed together. Inward-facing ribs 34 of the ring 33 engage in the groove 32 and a corresponding groove of a second interface, not shown, which is to be connected with the interface 14; the interfaces are held pressed against each other through sloping contact surfaces 16, 16' on the ribs 34.

Figure 7:
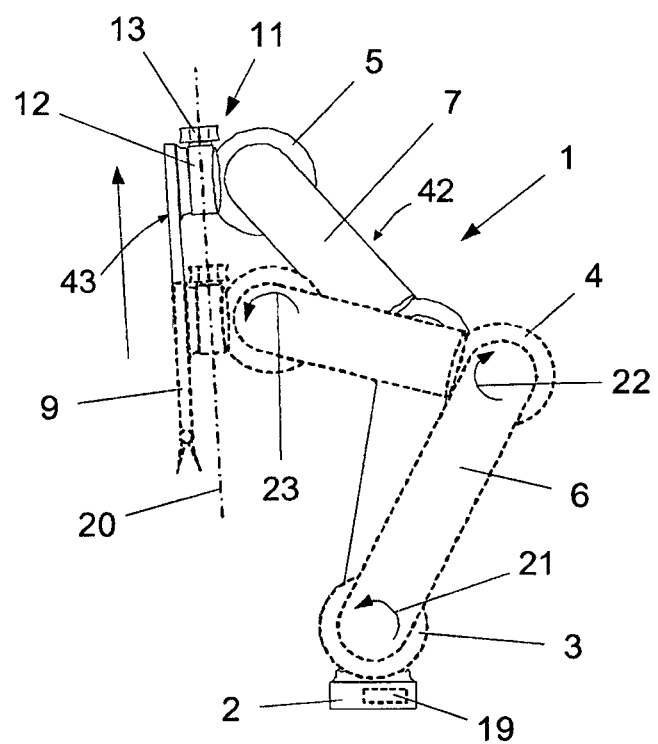
FIG. 7 shows a robotic arm moved from one position to another position.

The input module 11 is in principle suitable for controlling any modular component of the robotic arm 1. Which modular component moves in response to an input and how it is moved, or how many may be moved simultaneously, can be defined through programming of a control unit 19. The control unit 19 can, as shown in FIG. 2, be housed in the base component 2, FIG. 7 illustrates the case that the control unit 19 is programmed, in a first operating mode, to translate inputs generated by an input module 11 installed between the arm modules 43, 42 into movements of the arm modules 41, 42 in such a way that the arm module 43 is moved in the direction of a force applied to the input module. If a user pulls the control element 13 upwards along a path 20, the control guides the robotic arm 1 along this path 20 by simultaneously controlling anticlockwise rotations of the articulated joint modules 5 and 3 and a clockwise rotation of the articulated joint module 4. In this way, the end effector 10 can be positioned rapidly and effectively in any desired location within the range of the robotic arm. A rotary moment applied to the control element 13 can be evaluated in order to control the orientation of the end effector 10 in space through a rotation of the articulated joint module 5 (see FIG. 8).

The control unit 19 can then be switched over into in a second operating mode in which it controls the end effector 10 in response to the inputs from the control element 13.

Generally speaking, a significantly more precise positioning control is required in the second operating mode than in the first. It can therefore be provided that in the second operating mode the control translates a given deflection of or application of force to the control element 13 into a smaller adjustment movement or a slower speed of adjustment than in the first operating mode.

The control element 13 can, as already mentioned, be operated in up to six degrees of freedom. This means that an actuation command can be generated for the six degrees of freedom possible in three-dimensional space. In this way, a robotic arm which is also equipped with at least six degrees of freedom can be guided freely in three-dimensional space.

The input module 11 can be equipped with acceleration sensors and/or an inertial measuring system. This makes it possible to register the accelerations which act on the input module 11 itself due to the movement of the robotic arm 1 caused through the operation of the input module 11. The sensor system can be integrated in the input module 11. In this way, the movement of the robotic arm 1 connected with the input module 11 can be controlled and monitored in terms of its acceleration and the parameters which can be derived from this, for example the speed.

Figure 9:
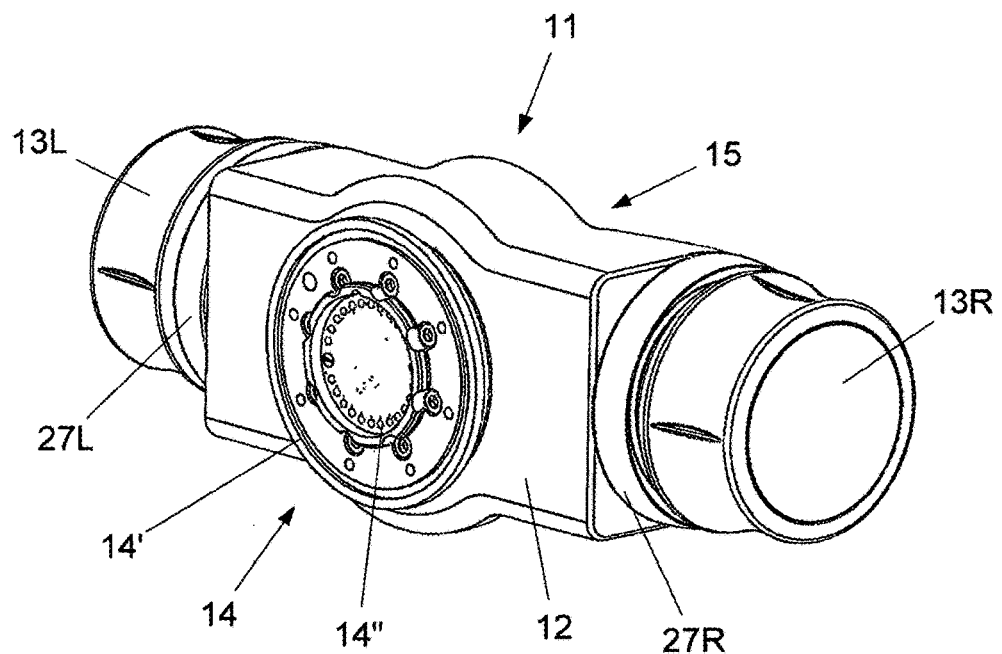
FIG. 9 shows an input module according to a second embodiment.

According to a second embodiment of the input module 11, the input module 11 can include several control elements. As FIG. 9 shows, the input module 11 can have a right-hand control element 13R and a left-hand control element 13L, which can also be designed as a cap. In contrast to the version with a single control element 13, accessibility of the control element can be improved. If one of the control elements is difficult to reach, the robot 1 can be controlled manually by means of the other control element.

In order to prevent the robotic arm 1 from responding to an accidental operation of a control element 13L, 13R, the input module 11 can be designed such that in order to generate a valid control signal both control elements 13R and 13L must always be operated together. The respective manipulations of the right-hand and left-hand control elements 13R and 13L can be compared and verified through the electronic circuitry 17 integrated in the input module 11. Only following such verification is a control signal generated by the electronic circuitry 17.

Alternatively, the control elements 13L and 13R can be used as separate control elements, whereby the control elements can be used to carry out a fine positioning and a rough positioning. One control element, for example the cap 13R, can thereby be intended for the fine positioning and the other control element, for example the cap 13L, for the rough positioning. This means that the module controlled from the input module 11 can be moved more slowly but more precisely through the fine positioning and less precisely but more quickly through the rough positioning.

Moreover, the rough and fine positioning can be differentiated not only through the speed but also through the control strategy. Thus, according to the invention a speed control can be carried out with the rough control and a position control with the fine control.

In order to avoid a control conflict in the event of the control elements 13R and 13L being operated simultaneously, the fine positioning can be given priority over the rough positioning.

Alternatively, one of the control elements can be used for the control of modular components which are arranged between the input module 11 and the base component 2 according to the aforementioned first operating mode, while at the same time the other control element is used for the control of modular components arranged beyond the input module 11, in particular the arm module 43.

Figure 10:
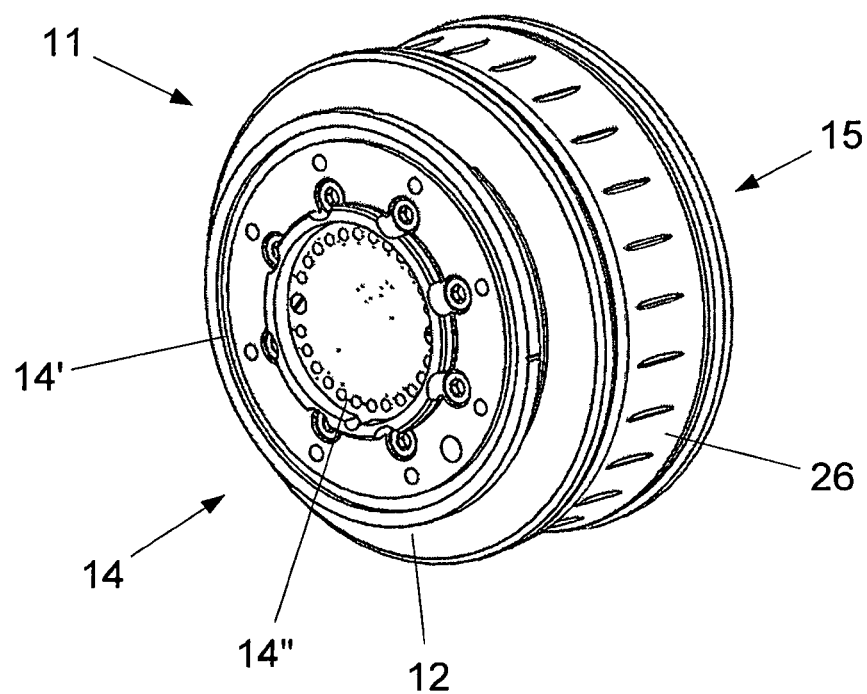
FIG. 10 shows an input module according to a third embodiment.
Figure 11:
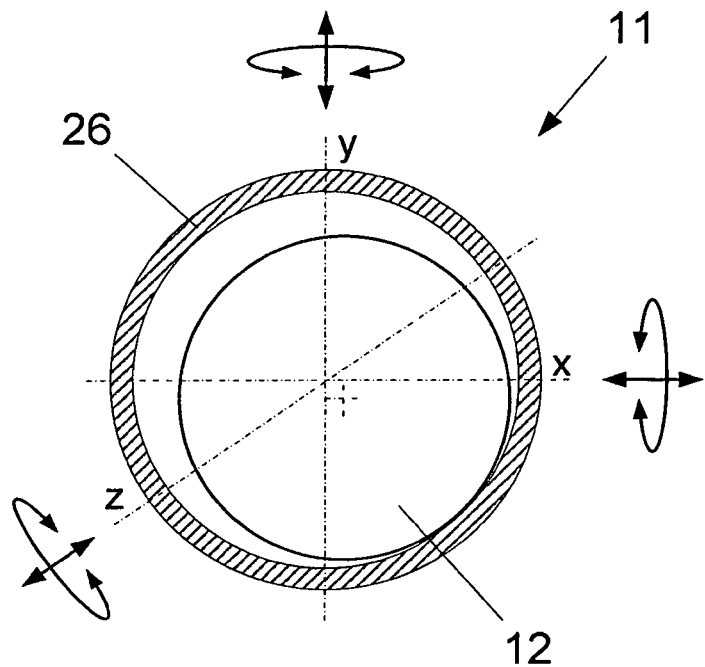
FIG. 11 shows a diagrammatic sectional view of an input module according to FIG. 10.

In a third embodiment, the control element 13 of the input module 11 can be designed as a control ring 26 which is arranged around the base component 12, as shown in FIG. 10. The function of the control ring 26 is identical to that of the control element 13 which is designed as a cap, so that the control ring 26 can also preferably be operated manually in 6 degrees of freedom. For this purpose, the control ring 26 can be mounted appropriately around the housing 12. This allows adjustment movements of the control ring 26 along the 3 spatial coordinates x, y and z as well as rotary movements around the 3 spatial coordinates x, y and z. FIG.

Figure 12:
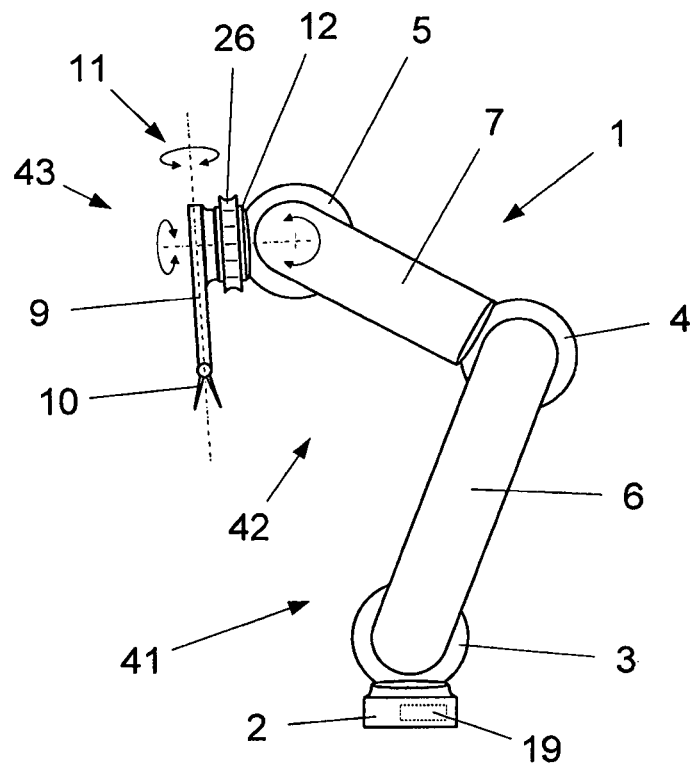
FIG. 12 shows a robotic arm with an input module according to the third embodiment.

11 illustrates this by way of example in a diagrammatic view in which the control ring 26 mounted around the base body 12 is deflected in x- and y-direction. The control ring 26 can be operated analogously in the other directions of movement or rotation. FIG. 12 shows the input module 11 inserted between the arm modules 42 and 43; like the input module shown in FIG. 1 it can also be installed between the arm modules 41 and 42 or between modular components of an arm module.

The control element 13 or 13L or 13R of the input module 11 according to the first or second embodiment (see FIG. 4, FIG. 9) can in each case be assigned a control dial 27 or 27R, 27L. This control dial 27 or 27R, 27L can be used alongside the control element 13 or 13R, 13L as an additional control element. The control dial 27 is arranged coaxially to a rotational axis of the control element 13 and can be rotated around this rotational axis. The rotary movement is registered by sensors. The sensor signal can be processed by the electronic circuitry 17. An actuation command for control of the robotic arm 1 and/or of the arm module 43 as well as its end effector 10 can be generated in response to the registered rotary movement.

Thus, in an advantageous manner, both the robotic arm 1 and an arm module 43 designed as an instrument can each be assigned a separate control element 13, 27 by means of a single input module. For example, the control element 13 can be used solely to control the arm modules 41, 42 and the control dial 27 can be used solely to control the arm module 43.

For example, the end effector 10 can be opened by rotating the control dial 27 in one direction and closed by rotating it in the other direction. Alternatively, by rotating the control dial the end effector 10 can be moved axially along its axis or rotated around its axis, as indicated for example in FIG. 12.

In order to prevent an unintentional operation of the input module 11, the input module can be connected with a circuit breaker (not shown). The input module can be activated or enabled or deactivated through operation of the circuit breaker. Advantageously, the circuit breaker is designed as a switch which can be operated with the foot. In this way, the input module can continue to be guided easily by hand, while the control commands from the input module are only implemented when the switch is activated with the foot. If the user removes his foot from the switch, the input module is automatically deactivated.

The input module 11 can also be equipped with means for the visual display of the operating status. Thus, it can for example be indicated to the user whether the input module is activated or deactivated, whether a fault is present, or which control mode (for example fine or rough positioning, control of the arm modules 41, 42 or of the arm module 43) is active. In addition to the statuses named above, further statuses not described in detail here can also be displayed. The visual display is preferably realised through lamp indicators, for example different coloured illuminated LEDs. Thus, a different colour can be displayed depending on the status as a sort of colour-coding. The colour red could thus indicate a fault status.

The lamp indicators can be integrated into any component of the input module, for example in the base body 12 or in the control element 13, 13R, 13L, 26. In an advantageous variant of the invention lamp indicators are integrated in the control dial 27 or 27R, 27L. If the control dial is formed of a transparent material, for example PVC, then the lamp indicators can illuminate the control dial in the relevant colour.

Advantageously, the control unit 19 automatically detects if an input module 11 is connected with the robotic arm 1. This means that the signals generated by the input module 11 can be received by the control unit 19 and used to actuate the robotic arm 1. If for example the control element 13 is operated, a signal corresponding to the operation can then be sent to the control unit 19. The control unit 19 can in turn process this signal and generate an actuation signal in order to move the robotic arm 1 in accordance with the operation of the control element 13.

Alternatively, the electronic circuitry 17 of the input module 11 can also be designed so as to control the robotic arm 1 directly, i.e. the input module 11 itself generates corresponding actuating signals from the registered operation of the control element 13.

Advantageously, the actuating signals from the control unit 19 and from the electronic circuitry 17 can be assigned different priorities so that, in the event that the control unit 19 and the electronic circuitry 17 generate an actuating signal simultaneously, only the higher-priority actuating signal triggers a corresponding operation of the robotic arm 1. If for example the actuating signal from the input module 11 has higher priority, it can always override the actuating signal from the control unit 19. Thus, the robotic arm 1 would always obey the actuating signal from the input module 11, even if the control unit 19 issues a different actuating signal. Alternatively however, the control unit 19 could also be granted priority over the input module 11.

In a further development of the invention, the controllability of the individual arm modules 41, 42, 43 is dependent on the installation position of the input module 11 in the robotic arm 1, so that either only the arm modules located on the side of the first interface 14 of the input module 11 or only the arm modules located on the side of the second interface 15 of the input module 11 can be actuated, i.e. either those modules arranged beyond the interface 14 or those arranged beyond the opposite interface 15 can be actuated.

In this way, a separation between an operation of the arm module 43 designed in the form of an instrument and of the other arm modules can be achieved. Either the arm module 43 designed in the form of an instrument can be operated while the robotic arm 1 remains stationary or the arm modules 41 and 42 integrated in the robotic arm 1 are operated while the instrument remains stationary. Thus, the instrument could be moved to a particular position in order to perform an operation in this position using the instrument. In order to make it possible to switch back and forth between these two control possibilities, the input module 11 is preferably equipped with a switchover button, which is not shown.

Advantageously, the arm modules 41, 42, 43 can be activated or deactivated individually. This allows different actuating strategies to be realised with the input module 11 depending of whichever module is activated. Much less precision of positioning is required in order to move the robotic arm 1 to a particular position in comparison with the operation of the instrument or its end effector 10. Conversely, the possibility of a rapid positioning of the robotic arm 1 would be advantageous. Therefore, depending of whichever module is activated, the input module 11 can control either a fine positioning or a rough positioning, i.e. with identical operation of the control element 13 the arm modules 41, 42, 43 are nonetheless moved in different ways, so that an arm module controlled by means of fine positioning moves more slowly but more precisely and an arm module controlled by means of rough positioning moves less precisely but more quickly. According to the invention a fine control is carried out if the arm module 43 designed in the form of an instrument is activated and a rough control is carried out if the arm module 43 is deactivated.

Moreover, the rough and fine positioning can be differentiated not only through the speed but also through the control strategy. Thus, according to the invention a speed control can be carried out with the rough control and a position control with the fine control.

Figure 8:
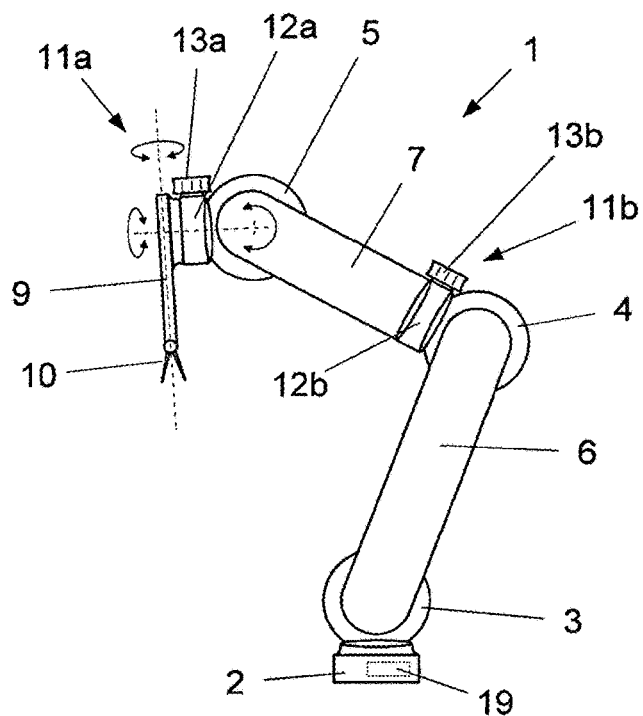
FIG. 8 shows a robotic arm with two input modules.

The electronic circuitry 17 or the control unit 19 can be expanded functionally to include a module recognition function which recognises all of the modules integrated in the robotic arm 1. The control unit 19 must know the dimensions and degrees of freedom of movement of the arm modules 41, 42, 43 in order to translate an input into a movement of the arm module appropriately. In the case of the input modules 11, both their number and their position in the robotic arm must be registered in order to be able to take them into consideration for the purpose of control. As FIG. 8 shows, several input modules 11a, 11b can be integrated in the robotic arm 1. If a force is applied to the input module, then the control unit 19 must initiate a movement of the articulated joint module 4 in the direction of this force, and the arm modules 42, 43 can be moved with it without being controlled. If, on the other hand, a force acts in the same direction on the input module 11a, then the articulated joint module 5 must be moved in the direction of this force, which, as described with reference to FIG. 7, can involve simultaneous rotations of the articulated joint modules 3, 4, 5.

According to a first control variant, both input modules 11a, 11b have equal priority, i.e. on simultaneous operation of both input modules, the actuating commands are both executed. For example, by simultaneously pulling on the control element 13b and holding the control element 13a stationary, a user can cause the articulated joint module 4 to be moved—around an obstacle—while at the same time the articulated joint module 5 remains stationary.

According to a further control variant, the individual input modules 11a, 11b can be assigned different priorities. The priorities can be assigned through the control unit 19 or can be defined automatically through the installation position of the input modules. For example, the input modules 11a, 11b can be programmed so that an input module located nearer the arm module 43 has a higher priority than a more distant input module. With reference to FIG. 8 this would mean that the input module 11a located closer to the arm module 43 would always override the other input module 11b. Again, this can prevent a conflict of actuating commands in the event of simultaneous operation of the input modules 11a and 11b.

REFERENCE NUMBERS

1 robotic arm
2 base module
3 articulated joint module
4 articulated joint module
5 articulated joint module
6 arm module
7 arm module
8 interface of the third arm module
9 instrument shaft
10 end effector
11 input module
11a input module
11b input module
12 base body
13 control element
13R control element
13L control element
14 first interface of the input module
14' connecting means
14" contact
15 second interface of the input module
15' connecting means
15" contact
16 contact surface of the connecting ring
16' contact surface of the connecting ring
17 electronic circuitry
18 electrical cable
18' electrical cable
19 control
20 movement path
26 control ring
27 control dial
27R control dial
27L control dial
32 groove
33 connecting ring
34 rib
35 interface circuit board
38 first interface of the second arm module
39 second interface of the second arm module
40 first interface of the first arm module
41 first arm module
42 second arm module
43 third arm module
44 adapter

The invention claimed is:

1. A robotic arm having at least first and second robotic arm segments respectively, which are moveable relative to one another, and at least one manually operable robotic arm movement control element configured for generating robotic arm movement control signals for initiating and controlling the movement of the robotic arm on the basis of a user input supplied to the least one manually operable robotic arm movement control element, characterized in that said at least first and second robotic arm segments have a first arm module interface respectively onto which the manually operable robotic arm movement control element can be selectively mounted and wherein a movement of the robotic arm is effectuated, in at least one mode of operation, under control of said manually operable robotic arm movement control element and wherein the at least one manually operable robotic arm movement control element includes two interfaces and wherein one of said two input module interfaces is configured for being connected with the first robotic arm segment and the other of said two input module interfaces is configured for being connected with the second robotic arm segment.

2. The robotic arm according to claim 1, further including a robotic arm movement controller configured to identify an arm module interface to which the manually operable robotic arm movement control element is mounted, and for utilizing the identification of the arm module interface for determining said control signals to be supplied by the manually operable robotic arm movement control element to said robotic arm movement controller, for the control of movement of the robotic arm.

3. The robotic arm according to claim 2, characterized in that said robotic arm movement controller is configured to control a movement of the robotic arm in such a way that the arm module interface to which the manually operable robotic arm movement control element is mounted is moved in the direction of a force applied by a user to the manually operable robotic arm movement control element.

4. The robotic arm according to claim 1, characterized in that the second robotic arm segment includes a second arm module interface which is configured for being connected with the first arm module interface of the first robotic arm segment.

5. The robotic arm according to claim 4, characterized in that two arm module interfaces of the second robotic arm segment are moveable relative to one another in at least one degree of freedom.

6. The robotic arm according to claim 4, characterized in that the first arm module interface is of a first type and the second interface is of a second type, structurally different from the first type, and wherein one of the two input module interfaces of the at least one manually operable robotic arm movement control element is of the first type and the other input module interface of the second type.

7. The robotic arm according to claim 1, further including a third robotic arm segment configured for being mounted on the first interface of the second robotic arm segment.

8. The robotic arm according to claim 7, characterized in that the third robotic arm segment is configured for being connected with an interface of the at least one manually operable robotic arm movement control element.

9. The robotic arm according to claim 7, characterized in that an interface disposed on the third robotic arm segment is configured for being mounted selectively on one of the first interface of the second robotic arm segment or on the at least one manually operable robotic arm movement control element.

10. The robotic arm according to claim 7, characterized in that the third robotic arm segment is one of a tool or an instrument.

11. The robotic arm according to claim 1, characterized in that the at least one manually operable robotic arm movement control element has a base body around which extends a control element.

12. The robotic arm according to claim 11, characterized in that the interfaces of the at least one manually operable robotic arm movement control element are located on two end faces of the base body separated from one another by a control element.

13. The robotic arm according to claim 1, characterized in that the at least one manually operable robotic arm movement control element has two control elements, and wherein a first one of the two control elements controls a direction of movement of the robotic arm and the second one of the two control elements controls a speed of movement of the robotic arm.

14. The robotic arm according to claim 1, characterized in that the at least one manually operable robotic arm movement control element has two control elements, and wherein one of the two control elements controls the direction of a movement of the robotic arm with a first speed, and the second one of the two control elements controls the direction of a movement of the robotic arm with a second speed.

15. The robotic arm according to claim 14, characterized in that, on simultaneous operation of the control elements, only the control commands of one control element are executed.

16. The robotic arm according to claim 1, characterized in that the at least one manually operable robotic arm movement control element includes a device which registers the accelerations acting on the at least one manually operable robotic arm movement control element.

\* \* \* \* \*